United States Patent
Merryman et al.

[11] Patent Number: 5,806,862
[45] Date of Patent: Sep. 15, 1998

[54] SECURITY WHEEL APPARATUS FOR DETERRING THEFT OF MANUALLY OPERATED WHEELED VEHICLES

[75] Inventors: Douglas E. Merryman, Campbell; Christian B. Jordan, IV, Santa Clara; George C. Coakley, Los Gatos, all of Calif.

[73] Assignee: PolyTracker, Inc., San Jose, Calif.

[21] Appl. No.: 662,348

[22] Filed: Jun. 12, 1996

Related U.S. Application Data

[63] Continuation-in-part of Ser. No. 372,486, Jan. 12, 1995.

[51] Int. Cl.$^6$ .................................................. G08B 13/14
[52] U.S. Cl. ........................................ 280/33.994; 188/111
[58] Field of Search ...................... 280/33.994; 188/1.12, 188/31, 69, 111

[56] References Cited

U.S. PATENT DOCUMENTS

| | | | |
|---|---|---|---|
| 498,271 | 5/1893 | Hoobler | 188/1.12 |
| 3,590,962 | 7/1971 | Parker | 280/33.994 |
| 3,804,300 | 4/1974 | Cox | 222/67 |
| 4,609,075 | 9/1986 | Snedeker | 280/33.994 |
| 5,315,290 | 5/1994 | Moreno et al. | 280/33.994 |
| 5,432,412 | 7/1995 | Harris et al. | 188/69 |
| 5,576,691 | 11/1996 | Coakley et al. | 181/111 |
| 5,598,144 | 1/1997 | Lace | 188/111 |

*Primary Examiner*—Thomas J. Brahan
*Attorney, Agent, or Firm*—Claude A.S. Hamrick; Oppenheimer W. Donnelly; Justin F. Boyce

[57] ABSTRACT

Apparatus for deterring unauthorized use and removal of steel or steel-and-plastic constructed swivel-wheel shopping carts by preventing the free movement of one or more of the installed wheels after the cart is moved a predetermined distance. A braking device, fully contained within a wheel, measures the distance traveled beyond an activating point by counting the number of rotations made by the cart wheel and compares the count to a preprogrammed stored attribute that defines the allowable distance the cart is allowed to travel once outside the shopping facility. Depending on the direction the cart is travelling, the counter is "armed" or "disarmed" when the cart passes over low-frequency magnetic arrays placed at the entry and/or exit of the shopping facility.

23 Claims, 10 Drawing Sheets

SECURITY WHEEL APPARATUS FOR DETERRING THEFT OF MANUALLY OPERATED WHEELED VEHICLES

This application is a continuation-in-part of our copending application entitled "METHOD AND APPARATUS FOR DETERRING THEFT OF MANUALLY OPERATED WHEELED VEHICLES", U.S. Ser. No. 08/372,486 filed on Jan. 12, 1995.

BACKGROUND OF THE INVENTION

1. Field of the Invention

This invention relates generally to anti-theft devices for manually powered swivel-wheel shopping carts, and particularly to an apparatus for use in controlling or inhibiting the unauthorized use and removal of these swivel-wheel shopping carts from a specified or designated area.

2. Brief Description of the Prior Art

Presently, there are thousands of grocery stores, shopping plazas, hardware and gardening centers that provide their customers with the convenience of having a shopping cart available to transport goods to and from their premises. Once the customer is finished with the cart, it is typically returned to a designated area or simply abandoned in the store's parking lot. Due to the number of shopping carts used during the course of a business day by one of these stores or supermarkets, it is difficult to account for each and every cart used. Shopping carts are often stolen or borrowed for some otherwise innocent purpose. However, regardless of the purpose for removal, once a cart is removed from a store's premises, it is almost never returned.

The cart owners are justifiably concerned about the unauthorized use and theft of their shopping carts since the average shopping cart costs approximately $120.00. Due to the expense, as well as the frequency of theft, lucrative businesses have been created specializing in shopping cart recovery. However, industry statistics have shown that these firms are only able to recover approximately thirty percent of all the carts stolen or removed during the course of a calendar year. This means that out of a million carts stolen each year there are over 600,000 carts that are never recovered. By adding costs associated with both replacement and recovery to the day-to-day operations of these business, an anti-theft system that tends to prevent a shopping cart from ever leaving a store's premises will save the retail industry in excess of $60 million per year.

Previous methods have been devised in an attempt to prevent shopping carts from being removed or stolen. One such system includes installation of physical barriers along the perimeter of a parking area to prevent the user from pushing the cart into the parking area. However, such barriers are impractical since it is desirable to allow a customer to take the cart to his car for the loading or unloading of his goods. Other anti-theft devices or systems designed for shopping carts are configured with some type of wheel-locking mechanism that is triggered by either a timer, or by a magnetic field with a fixed frequency, when the shopping cart passes through it. Most of these anti-theft systems require extensive modifications to the shopping cart and the wheel so that the locking mechanism works properly. An example of this type of system is disclosed in U.S. Pat. No. 2,964,140 granted December 1960 to M. N. Brezny. This anti-theft system employs an electromagnetically actuated, pin-directed braking mechanism which can be installed in place of one or more of the cart's wheels. Upon activation, the system forces a horizontally positioned pin into an aperture in the wheel, preventing the wheel from turning or moving any farther. The disclosed device incorporates a fixed magnetic field as a means of activating the brake mechanism at an appropriate time. When the cart passes over a cable that has been either embedded in the concrete about the perimeter of the parking lot to generate a magnetic field, or has been placed in front of the exit of the store, a sensor activates and closes a switch in the control logic of the locking mechanism that, in turn, forces the pin into an available opening in the wheel, impeding its rotation.

Anti-theft devices like the one described above have had a number of problems. Firstly, the devices require that a magnetic cable be installed around the perimeter of the parking lot, or if the magnetic cable is used at the exits of the parking lot, then the lot must be fenced. In any event, neither of these approaches are cost-effective or practical. Secondly, the brake mechanism of the Brezny system is exposed and susceptible to being damaged by a person bent on stealing the cart. Thirdly, this approach requires that the sensory and the braking elements of the system be calibrated and balanced several times a month to operate effectively. If the system is not calibrated or maintained properly, the locking mechanism will not respond properly, thus locking the wheel prematurely.

Another approach is disclosed in U.S. Pat. No. 4,242,668 granted December 1980 to W. Herzog. This apparatus mounts to the front of a cart and uses a latched brake or blocking mechanism which falls down in front of the cart, stopping its forward progress. Like Brezny's system, the latched brake mechanism is activated by a sensor installed on the cart's undercarriage. The sensor detects when the cart has crossed over a magnetic strip placed at an exit of the parking lot. Once again, the principal disadvantage of this anti-theft system lies in the prohibitive expense and complex modification required to install this type of system to the undercarriage of an existing cart. Again, like Brezny, Herzog leaves the locking device, or mechanism, open to vandalism and damage by a would-be thief.

Still another approach can be found in U.S. Pat. No. 3,652,103, granted in March 1972 to S. P. Higgs. Unlike the other systems described above, this system incorporates a timer to activate a braking mechanism. With this type of system, when the cart leaves the shopping facility, the timer is activated and after a predetermined period of time, the brake mechanism engages, interfering with further movement of the cart. Here, the time period is determined by how much time a customer requires to reach the farthest point of the parking lot plus some contingency for a momentary stop or delay. With this approach, when the timer approaches its limit, it slowly engages the brake making the cart more and more difficult to move. Thus, if a customer is parked at the farthest point in the parking lot, and the braking mechanism engages prematurely, making the cart difficult to push, a great deal of customer annoyance and dissatisfaction results. Furthermore, the expense required to install and maintain an anti-theft system of this type will have a significant impact on the overhead costs associated with a typical retail operation.

Further still, another and somewhat more practical solution is disclosed in U.S. Pat. No. 4,772,880 granted September 1988 to L. W. Goldstein et al. This patent discloses a clamp-on, battery-powered receiver and sensor system that detects when a cart is about to be removed and activates a bolt-on locking mechanism to prevent the cart from leaving a parking lot or prescribed use area. Although easily installed, this type of device is subject to vandalism and removal, thus allowing the cart to be damaged or easily stolen. Like the other systems defined above, this system requires that a set of transmitters be installed around the perimeter of the parking lot and adds substantially to the start-up and maintenance costs to support such a system.

As illustrated by the numerous thefts that occur each and every day, these systems have failed to prevent or even substantially reduce the unauthorized removal of such carts. In addition, these systems tend to be difficult to install and maintain, requiring special equipment and tools to keep the cart in operational condition. More importantly, most of these systems require that expensive components be added to each shopping cart, not to mention the expense required for the equipment that must be installed around the perimeter, or at the exits of a parking lot, in order to operate the system effectively.

Thus, there still exists a substantial need to provide a cart theft deterrent system that is cost-effective to produce, install and maintain.

SUMMARY OF THE INVENTION

The present invention provides apparatus that significantly reduces unauthorized use and removal of steel or steel and plastic constructed swivel-wheel shopping carts by preventing the free movement of one or more of the installed wheels. A braking device in accordance with the present invention is fully contained within a wheel and measures the distance traveled beyond an activating point by counting the number of wheel rotations made by the cart wheel and compares this to a preprogrammed stored attribute that defines the allowable distance the cart is allowed to travel once outside the shopping facility. Depending on the direction the cart is travelling, the counter is "armed" or "disarmed" when the cart passes over low-frequency magnetic arrays placed at the entry or exit of the shopping facility.

An advantage of the present invention is that the entire operating mechanism is contained within the hub of the wheel and is thus passive and unobtrusive. When the shopping cart is within the confines of the market, store or shopping facility, it is transparent to the cart user and the cart is free to move about as the customer sees fit. Once the cart exits the shopping facility, the counter is activated and starts a predetermined countdown of wheel rotations before the brake is engaged to stop the cart. The cart remains at the point of brake engagement until it is unlocked or reset by a store employee or a designated retrieval service.

Another advantage of the present invention is that the braking and sensor assembly can be readily and conveniently installed on existing swivel-wheel shopping carts.

A further advantage of the present invention is its simple construction and reasonable cost of manufacture.

Yet another advantage of the present invention is that both the sensor/counter, as well as the braking elements, are of durable design with minimum maintenance requirements.

Still another advantage of the present invention is that after the braking mechanism has been engaged, it can readily be deactivated and restored to its normal state by an authorized store employee.

These and other objects and advantages of the present invention will no doubt become apparent to those skilled in the art after having read the following detailed description of the embodiments which are illustrated in the several figures of the drawing.

DETAILED DESCRIPTION OF THE PREFERRED EMBODIMENTS

Figure 1:
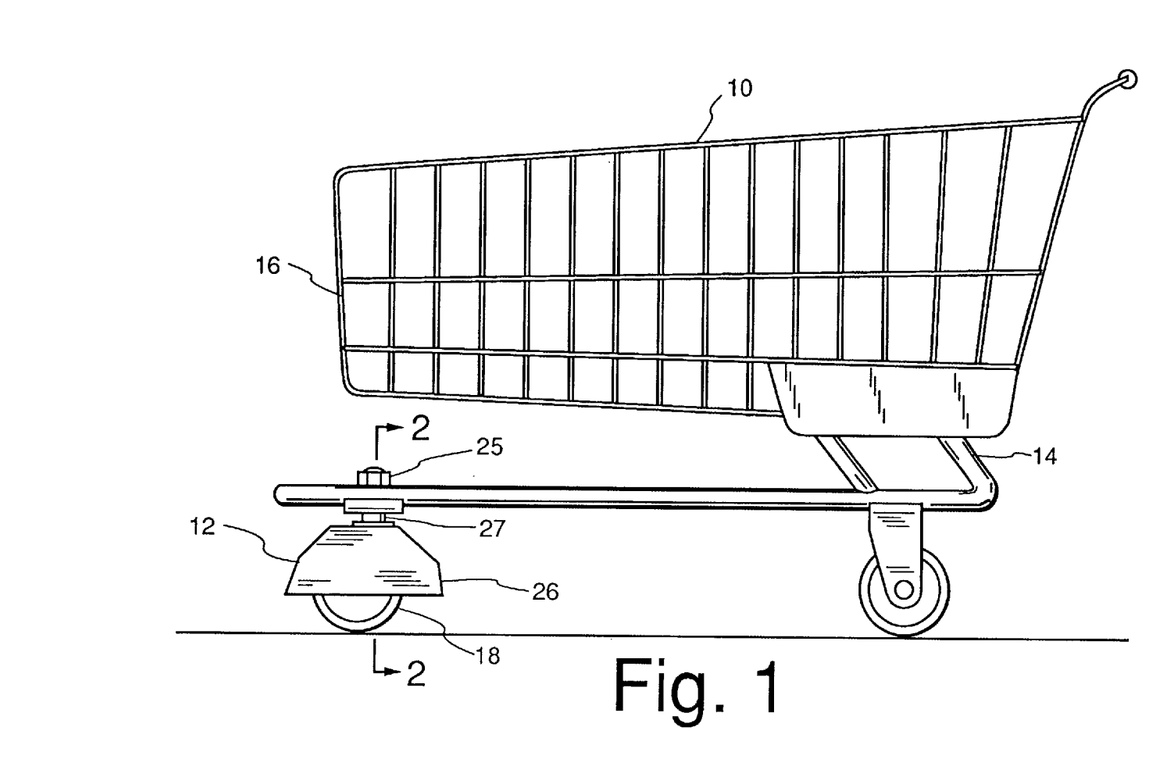
FIG. 1 shows a conventional shopping cart which has been fitted with anti-theft apparatus in accordance with an early embodiment of the present invention.

FIG. 1 shows a conventional shopping cart 10 which has been fitted with a cart-mounted unit 12 forming a part of the anti-theft system that constitutes an early embodiment of the present invention. Typically, shopping carts like the one shown in this diagram are constructed with a tubular metal frame 14 on which is mounted the wire or plastic basket 16 that supports a handle mounted in the usual fashion. Two pairs of wheels are attached to the lower portion of the frame 14, and the two wheels in the front are pivotally mounted to the frame 14 to swivel about vertical axes while the rear wheels 22 and 24 are fixed to the frame 14 and rotate about fixed axles.

As shown, the cart-mounted unit of the preferred embodiment is comprised of an assembly that includes a wheel 18 that replaces one of the cart's original front wheels. Unlike other approaches, the cart-mounted unit 12 is a fully self-contained assembly. That is, the wheel 18 and all of the operative components used to automatically stop the cart's forward progress are housed in a protective enclosure 26.

Initially, when the system is disarmed, the cart 10 is able to travel freely such that each wheel can rotate and the cart can move without restriction. Depending on the store's specific requirements or application, the unit 12 can be easily installed in place of either a front or a back wheel of the cart. However, as indicated, a front wheel configuration is preferred because the retrofitting operation can be performed by removal of a single nut, i.e., the nut 25 used to secure the pivot shaft 27 of the swivel-wheel mount to the cart frame. When installed, as indicated, at the left front wheel position, for example, and when the braking mechanism contained within unit 12 is engaged (as will be explained below), the cart will come to an abrupt stop making the cart difficult to move in any direction. As will also be explained below, the setting and resetting of the unit is normally automatic and requires no attention unless the cart is misused. And even in the event of misuse, the unit can be easily reset by an authorized employee.

Figure 2:
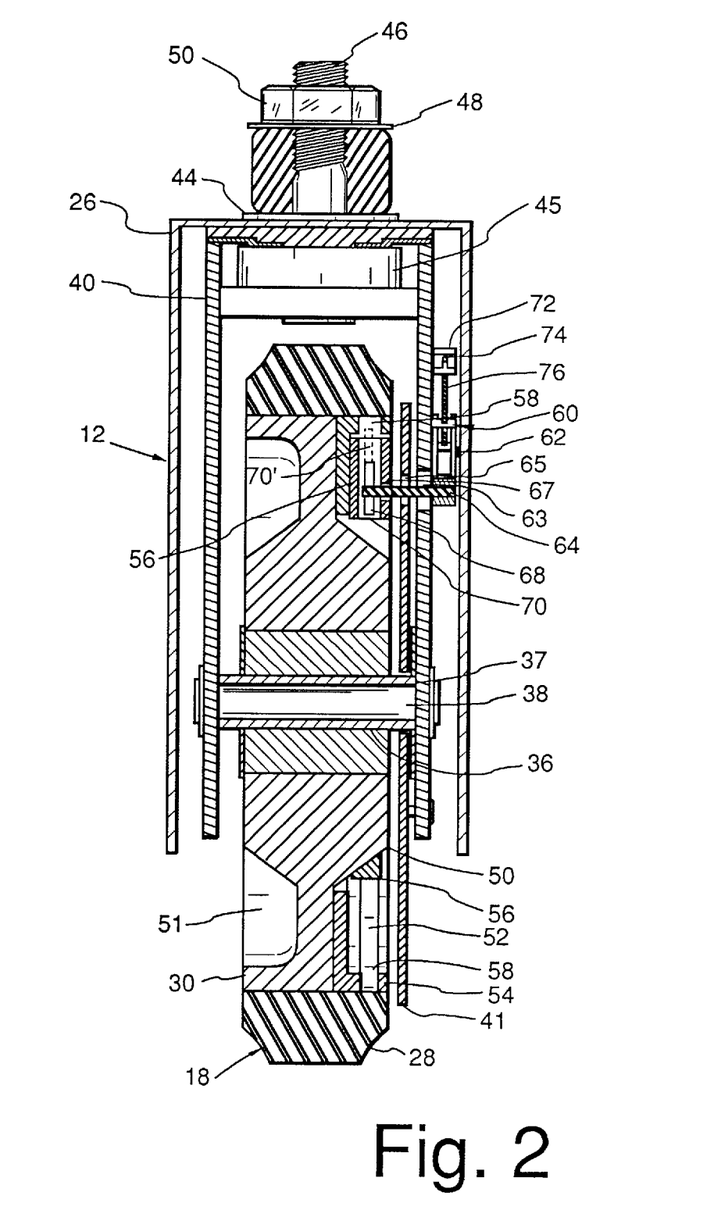
FIG. 2 is a cross-section taken along the line 2—2 of FIG. 1 of the brake assembly of the cart theft deterrent system.

Referring now to FIG. 2 wherein the principal functional components of the cart-mounted unit are depicted, it will be noted that the wheel 18 is comprised of a rim 28 molded from hardened rubber or rubber-like material which has been placed about the circumference of a metal or plastic wheel hub 30. The hub 30 includes a sleeve bearing 36 that allows the wheel 18 to easily rotate about its axis on a tubular shaft bearing 37 through which an axle bolt 38 extends to secure the wheel to a component support frame assembly and yoke 40. In addition to holding the wheel 18 in position, the yoke 40 is designed to serve as the mounting facility for all of the functional components of the unit. Covering yoke 40 and the other elements of the preferred embodiment of the present invention is the protective enclosure 26. Supported by the yoke 40, the enclosure 26 is secured in place by a washer 44 when the unit 12 is installed in position by means of a swivel assembly 45 including a threaded swivel shaft 46 which extends through an opening 47 in frame 14 and is secured thereto with a nut 50 and lock washer 48.

As illustrated, annular recesses 51 and 52 have been formed in opposite faces of the wheel hub 30. The recess 52 in face 50 of the wheel hub 30 is configured to accommodate both the brake plate 54 and a horseshoe-shaped flange 56 affixed to yoke 40 and cover plate 41 and described below with reference to FIG. 4. The brake plate 54 is a ring, having an L-shaped cross-section, that fits securely in recess 52 and is fastened to hub 30 by suitable fasteners (not shown). The dimensions of the brake plate 54 are slightly smaller than those of its host thus, providing a snug fit which in turn, prevents any relative movement when the locking mechanism is engaged. The brake plate 54 has four strategically placed radically extending apertures 58 that are 90° apart to receive a locking pin when the braking or locking mechanism is engaged. The physical dimensions of the apertures 58 are selected as appropriate for receiving the locking pin.

Mounted to the outside face of yoke 40 is an actuating arm and lock assembly shown generally at 60. The assembly 60 includes an actuator arm 61 pivotally secured to yoke 40 by a pivot pin 62. Attached to arm 61 is a horizontally extending connecting rod 64 that extends through a set of apertures 63, 65 and 67 in the yoke 40, a cover plate 41, and the flange 56, respectively. The distal end of rod 64 is affixed to the lower end of a locking pin 68 disposed in a vertically extending bore 70 formed in flange 56. As described below, as the arm 61 is rotated about pin 62, its lower end will rise, and through connecting rod 64 raise pin 70 as indicated by the dashed lines 70' into locking engagement with one of the apertures 58. As will also be described in more detail below, the arm 61 is operatively connected by an actuator spring 76 to a lead screw follower 72 threadably engaged to a lead screw 74.

Figure 3:
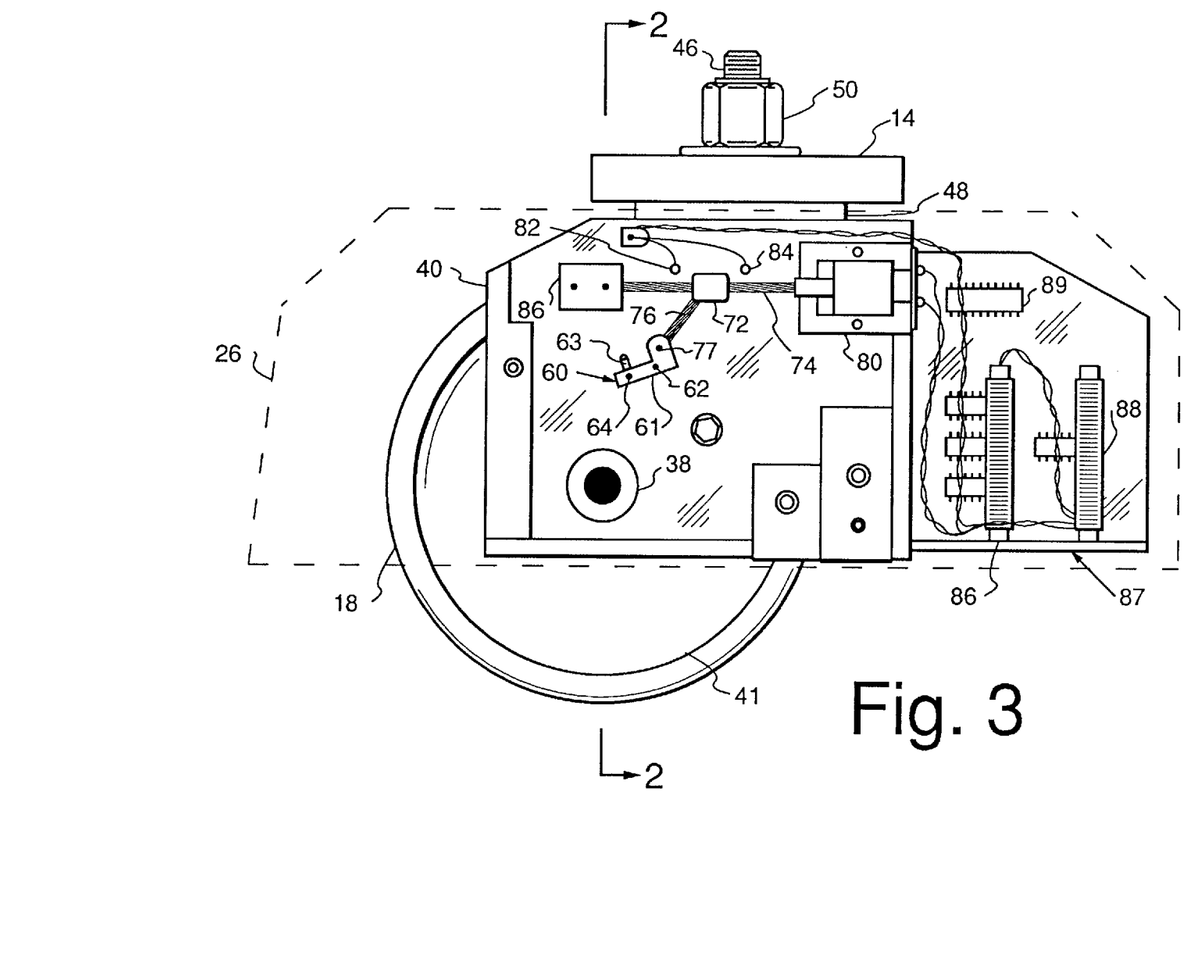
FIG. 3 is a side view depicting essential elements of the brake assembly illustrated in FIG. 2.

FIG. 3 is a side view of the unit with cover 26 (shown in dashed lines) removed. Shown in this figure are the external components of the brake assembly including a bi-directional motor 80 that drives the threaded lead screw of shaft 74 that is terminated at its distal end by a bearing block 86 affixed to yoke 40. Positioned about the shaft 74 is the screw-following collar 72 that travels up or down the shaft 74, depending on the direction the lead screw is turned by the motor 80. As previously mentioned, the actuator spring 76 is attached to the underside of the collar 72 and extends downwardly with its lower end being attached to the actuator arm 61 by means of a small connector pin 77. Strategically placed above the lead screw 74 are two limit switches 82 and 84 that determine the travel limits of the collar 84. As the collar 72 engages either of the switches 106 or 108, the power to the motor 80 is terminated, stopping the collar 84 in position. The first switch is the reset switch 106 and has been placed directly in front of the motor 110 to prevent the collar 72 from being driven into and damaging the motor 80. The other switch is placed near the other end of the shaft 82 to prevent the collar 72 from hitting the bearing block 86.

When power is applied to the motor 80, the threaded shaft 74 is turned in a direction causing the collar 72 to move forward, tending to compress the spring 76 to apply a force causing arm 60 to rotate counter-clockwise about pin 62 and into the unlatched position indicated. On the other hand, when motor 80 rotates lead screw 80 in the opposite direction,causing follower 72 to move rearwardly to the right as depicted, the follower applies a tensile force to spring 76, which in turn causes arm 61 to rotate in the clockwise direction lifting connecting rod 64 in slot 63 and raising pin 68 (FIG. 2). As the locking pin 68 moves upward along the bore 70 (FIG. 2) of the horseshoe-shaped flange 56, it will extend into one of the apertures 58 of the brake plate 54, thus stopping the rotation of the wheel 18.

To reset the locking mechanism, a command signal is sent changing the polarity of the motor 80. The motor 80 then turns the shaft 74 to send the collar 72 in the reverse direction. As collar 72 moves back along the shaft 74, it causes spring 76 to apply a force to the actuator arm 61 causing it to rotate counterclockwise, pulling the locking pin from engagement with the brake plate 54. When the locking pin 68 has been fully retracted and the actuator arm 61 has been set back to its original position, the system is considered disarmed, and the wheel can again move freely.

Shown affixed to the right side of yoke 40 at 87 is an electronics compartment containing the various electronic components required to operate the unit 12. Included among such components are a pair of electromagnetic field sensing antennas 86 and 88, various electronic devices 89, and a wheel rotation sensor 92.

Figure 4:
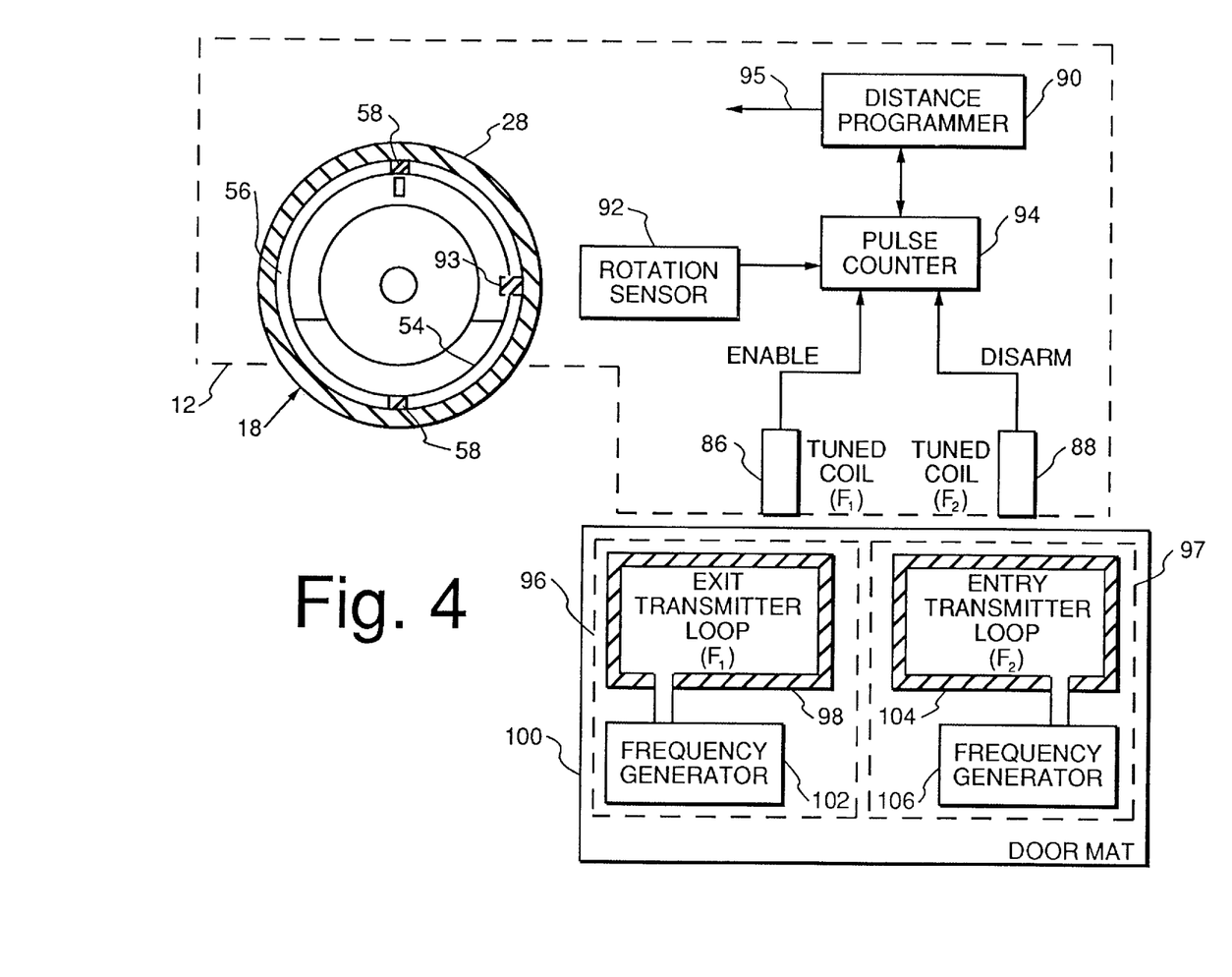
FIG. 4 is a block diagram illustrating the principal operative components that control the essential functions of the embodiment of FIGS. 1–3.

Reference is now made to FIG. 4 illustrating the principal operative components of a distance program module 90, a wheel rotation sensor 92, a pulse counter 94, and a pair of tuned coils 86 and 88 that serve as the electromagnetic-field-detecting sensors or antennae. Each time the wheel rotates, a small magnet 93 carried by the wheel excites the rotation sensor 92 causing it to generate an electrical pulse that is accumulated and stored by the pulse counter 94. Should the accumulated count be determined to equal a predetermined count stored in the distance programmer 90, a signal will be generated at 95 causing motor 80 to activate the locking mechanism to stop the cart's progress. The allowable cart travel distance is defined by the number of wheel rotations, and is normally preset at the time of installation.

In order to automatically set and reset a cart-carried unit 12, a pair of electromagnetic field transmitters 96 and 97 are provided and suitably positioned at appropriate locations relative to a given facility at which carts are provided. Passage in one direction through the localized electromagnetic fields generated by the transmitter sets the unit while passage through the fields in the opposite direction resets the unit. In the preferred embodiment, the two transmitters, or at least the field-generating loops thereof, are incorporated into a mat 100 over which the cart passes in exiting and entering the facility. Loop 98 is driven at a frequency $F_1$ by a signal generator 102, while loop 104 is driven at a different frequency $F_2$ by a signal generator 106.

The two coils 86 and 88 are respectively tuned to the frequencies $F_1$ and $F_2$. As the exiting cart travels through the fields generated by exit transmitter loops 96 and 104, the coils 86 and 88 will resonate at their tuned frequencies. If the cart has last passed through field $F_1$, it will in effect sense that it is exiting the facility and the counter 94 will be started to allow the cart to travel only the prescribed distance before the brake is activated. On the other hand, if the cart passes last through field $F_2$, the unit will sense that it is entering the facility, and the counter and brake mechanism will be reset, allowing the cart to move freely about the store or retail facility.

Figure 5:
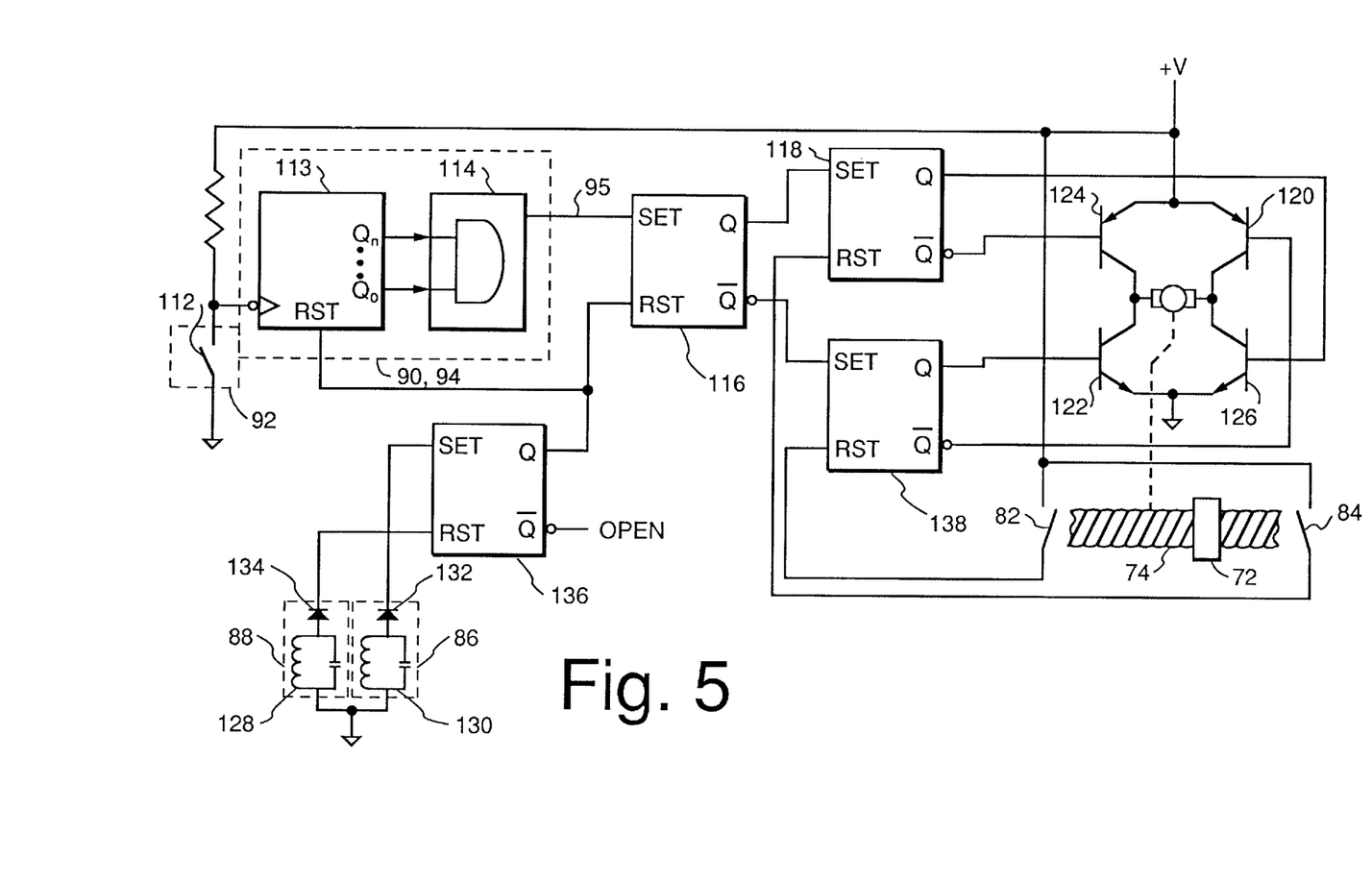
FIG. 5 is a circuit diagram showing in more detail the cart electronics shown in FIG. 4.

FIG. 5 schematically depicts a circuit diagram of the cart electronics used to manage and control the braking unit. As depicted in FIG. 4, the rotation sensor 92 is mounted on the component frame and yoke 40 in close proximity to the wheel 18. In the preferred embodiment, the sensor is comprised of a reed switch 112. Each time the magnet 93 passes the reed switch 112, it causes the normally open reed switch 112 to close and generate a pulse that increments the pulse counter 94. In the illustrated preferred embodiment, the pulse counter 94 and distance programmer 90, shown in FIG. 4, are implemented by the combination of a 14-bit binary counter 113 and a programmable AND gate 114. The outputs of counter 113 are input to the programmable AND gate 114 which in effect detects when the programmed count has been reached and generates an output at 95 which is coupled into the SET input of a set/reset latch 116. The Q output of latch 116 is connected to the SET input of a set/reset latch 118, the Q and $\overline{Q}$ outputs of which control a pair of transistors 124 and 126 that, when turned on, cause the motor 80 to turn the threaded shaft 74 to move the collar 72 in the direction of limit switch 84. The motor 80 will continue to turn shaft 74 until the collar 72 engages and closes the limit switch 84. Closure of switch 84 couples V+ to the reset input RST of latch 118, causing it to reset and turn OFF transistors 124 and 126, whereby motor 80 stops turning the shaft 74.

The $\overline{Q}$ output of latch 116 is connected to the set input SET of a third set/reset latch 138, the outputs of which control a pair of transistors 120 and 122 that, when turned ON, cause motor 80 to be energized in the opposite direction, driving collar 72 toward limit switch 82. The reset input RST of latch 116 is connected to the Q output of a fourth set/reset latch 136, the RST input of which is coupled to the output of the exit field sensing coil 86, and the SET input of which is coupled to the entrance sensing coil 88. Note that the Q output of latch 136 is also connected to the RST input of counter 113 so as to start the counter each time the cart exits the facility.

To move the collar 72 back to its reset position releasing the braking mechanism and freeing the wheel 18, transistors 120 and 122 must be activated to change the motor's polarity and turn the shaft 74 in the opposite direction to move collar 72 leftwardly (as depicted in FIG. 5). When the collar engages and closes the other switch 82, the motor 80 will again be turned OFF by the application of V+ to the RST inputs of latch 138, causing it to reset. As the collar 72 moves in the direction indicated, it applies, via spring 76 (FIG. 3), a force to actuator 61, causing it to rotate counterclockwise, causing locking pin 68 to mechanically disengage from the brake plate 54 (FIG. 2).

As previously mentioned, the two tuned coils 86,88 are used to arm and disarm the system. The coils are actually configured as tank circuits 128 and 130 that in the presence of alternating electromagnetic fields (alternating at the tuned frequencies $F_1$ and $F_2$, respectively) resonate and generate AC signals which are rectified by diodes 134 and 132, respectively, to provide inputs to the RESET and SET inputs of latch 136.

Specifically, as the tank circuit 128 passes in close proximity to the exit transmitter 96, which is emitting a field of frequency of $F_1$, an AC voltage is induced in the tank circuit 128. This voltage is then converted to a pulsating DC current by diode 134 which resets the Set/Reset latch 136. The Q output of latch 136 sets both latch 116 and counter 113, and the counter 113 thereby commences to record the number of wheel rotations, thus making it possible for the locking mechanism to activate if the cart should be taken beyond the prescribed distance.

Similarly, when the cart is returned to the store, and tank circuit 130 passes in close proximity to the entry transmitter loop 104, which is emitting a field of frequency $F_2$, an AC voltage is induced in the tank circuit 130. This voltage is converted to a pulsating DC current by diode 132 which places latch 136 in the set mode. The Q output thereof forces the counter 113 into its reset mode, thus preventing it from counting. In addition, if latch 116 has been set, it will be reset, forcing latch 138 to set and excite transistors 120 and 122, changing the motor's polarity and turning the shaft 74 in a direction which drives the collar 72 back toward switch 82 forcing the brake into it disengaged mode. The cart can now be pushed an unlimited distance without engagement of the brake.

Figure 6:
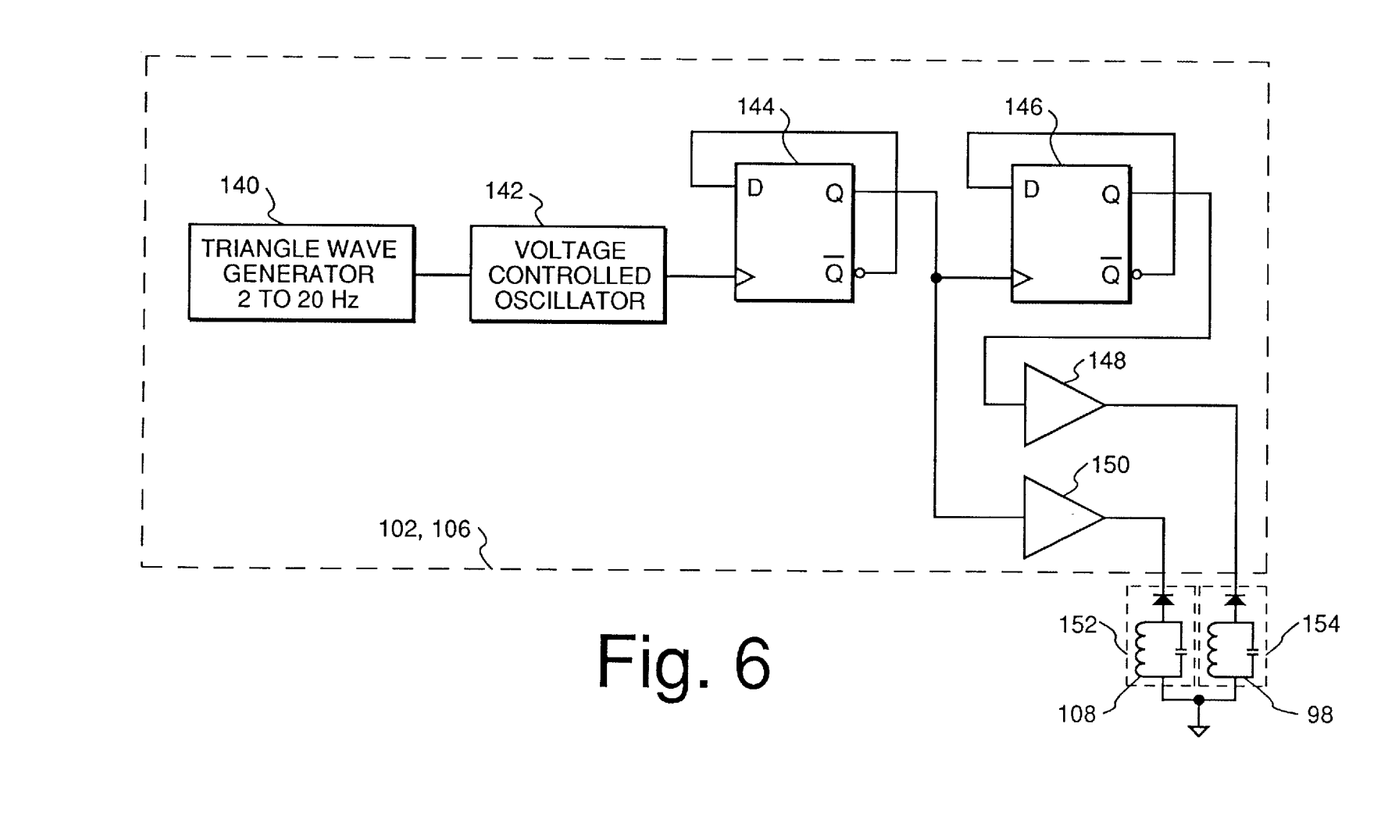
FIG. 6 is a block diagram showing in more detail the transmitter electronics used to activate or disarm the cart-mounted components of the preferred embodiment.

FIG. 6 depicts a block diagram of the transmitter electronics associated with mat 100 (FIG. 4) and used to either activate or disarm the system as the cart passes over it. Embedded in a rubberized door mat 100, the frequency generators 102 and 106 (FIG. 4) are combined in a single circuit comprised of a simple triangle wave generator 140 whose output signal controls an oscillator 142. Connected to the oscillator is a D flip-flop 144 that is configured as a divide-by-2 logic gate, the purpose of which is to produce a signal with a fifty percent (50%) duty cycle. This type of duty cycle generates a square wave signal without second harmonic content of the fundamental frequency of the square wave. This signal is used to drive a high current buffer 150 which in turn drives a tank circuit 152 including entry transmitter loop 108 to generate the entry field at frequency $F_2$. Similarly, another flip-flop 146, configured as a divide-by-2, drives a second high current buffer 148 which in turn drives a tank circuit 154 including the loop 98, used to produce the exit field operating at frequency $F_2$.

The purpose of the triangle wave generator 140 is to sweep the oscillator 142 over a fairly narrow range of frequencies to which the cart tank circuits may be tuned. By allowing the frequency to vary slightly from a known median frequency over some narrow range, a resonance match is always guaranteed when the oscillator 142 sweeps through those frequencies. This process alleviates the need to balance or calibrate the tank circuits in each cart, thus reducing if not eliminating the considerable expense required to maintain precise calibration in each and every cart brake mechanism.

The transmit power required for the entry and exit transmitters is very low due to the fact that the tank circuits have a high Q and the cart sensors are brought into close proximity to the mat 100. Furthermore, the frequencies used are in the 10 to 50 kHz range. Since the coils radiate predominantly magnetic energy at low power, there is no need to obtain FCC licensing.

The anti-theft apparatus described effectively discourages removal of shopping carts from parking lots. If a user tries to push a cart beyond the prescribed distance, the locking mechanism will activate and make it difficult to push the cart. This provides an effective deterrent to the unauthorized removal of these carts, particularly in cases where a user merely wants to use a cart to transport goods to his/her home (the major cause of shopping cart loss).

The design of the apparatus prevents easy manual tampering with the brake assembly, since all moving parts are within the protective housing. The apparatus is relatively inexpensive to manufacture and install, and will not interfere with normal use of the shopping cart.

Figure 7:
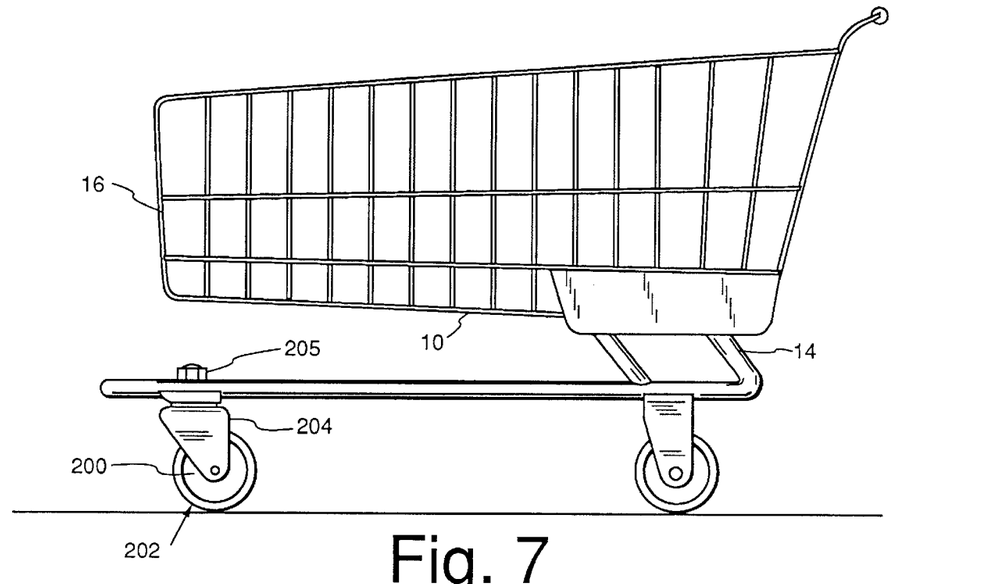
FIG. 7 shows a cart of the type depicted in FIG. 1 having a presently preferred embodiment of the present invention installed thereon.

In FIG. 7, a presently preferred embodiment of a security wheel unit in accordance with the present invention is depicted affixed to a shopping cart 10, as illustrated in FIG. 1, except that in this embodiment all operative components of the invention are contained within the hub 200 of wheel 202 which is mounted to the front of the cart 10 using a conventional swivel mounting assembly 204 that is attached to the cart frame 14 by means of a nut and bolt 205. Where tampering is likely, it may be advisable to use a "cone nut" as suggested by the dashed lines 205'.

Figure 8:
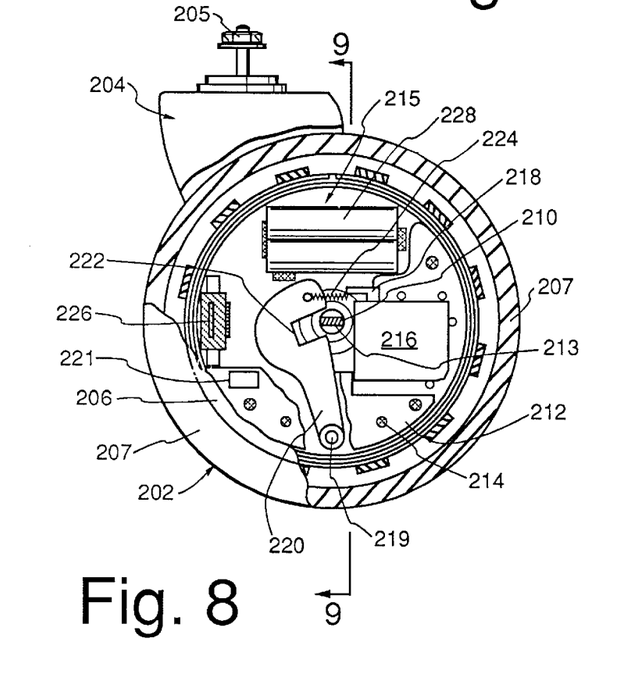
FIG. 8 is a broken-away side elevation of the embodiment of FIG. 7.
Figure 9:
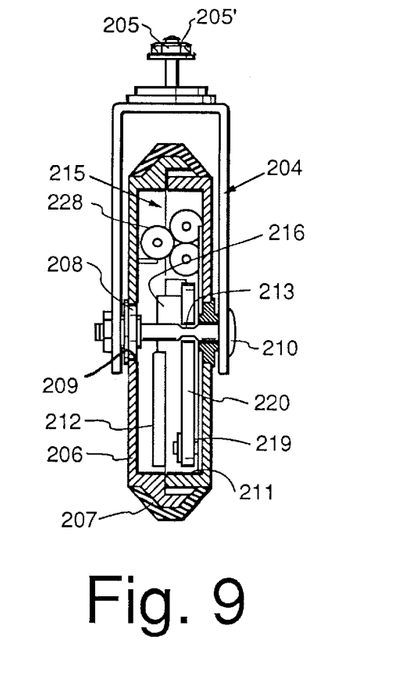
FIG. 9 is a partially broken cross-section taken along the line 9—9 of FIG. 8.

As illustrated in FIGS. 8 and 9 in partial broken section, the wheel 202 per se is formed by a two-part "clamshell" housing 206 having a precision wheel tread 207 molded thereabout. FIG. 9 is a partially broken cross-section taken along the line 9—9 of FIG. 8, and illustrating the nature of the hub-formed compartment or chamber 215. Bearing assemblies 208 are disposed within receiving openings 209 formed at the center of each hub shell. An axle bolt 210 attaches the wheel to the swivel assembly 204 and provides a fixed axle about which the wheel 202 can roll.

Disposed within an annular compartment 215 formed by the hub shells 206 are the operative components of the locking mechanism. A printed circuit board 212 that is affixed to one of the hub shells by means of screws 214 has most of the operative electrical components mounted thereon and forms the principal electrical circuit for the apparatus. Among the circuit components is a mercury switch 221 that opens and closes on each revolution of wheel 202 and thus provides a rotational input to the locking mechanism. Disposed adjacent the board 212 is a lock actuator 216 having a bell crank 218 pivotally attached thereto and rotatable between an unlocking position (as illustrated in FIG. 8) and a locking position. Disposed opposite the PC board 212 and pivotally affixed to a baseplate 211 by a pivot pin 219 is a latch arm 220 having a notch 222 (shown broken away in FIG. 9) formed therein for engaging the flats 213 of axle bolt 210. As will further be described below, the distal end of latch arm 220 is attached to actuator bell crank 218 by a spring 224. Disposed opposite actuator 216 is a magnetic field sensing coil 226 that is attached to circuit board 212, as will also be described below. Positioned opposite PC board 212 is a power supply 228 including one or more electrical batteries for powering the circuitry 212 and actuator 216. The relative positioning of the PC board 212, actuator 216, latch arm 220, batteries 228, and antenna 226 are perhaps most apparent in FIG. 8.

Figure 10:
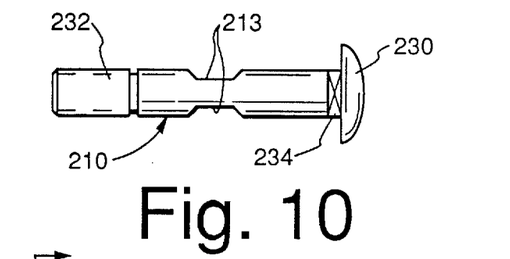
FIG. 10 is a side view illustrating details of the locking axle bolt shown in FIG. 9.

In FIG. 10, details of the axle bolt 210 are illustrated in more detail. As depicted, the bolt 210 has a button head 230 on one end and external threads 232 on the other end. The central bolt segment is cylindrical except for the flats 209 (for engagement with the notch 222 of latch arm 220), and a square section 234 which mates with a square hole formed in one leg of the swivel assembly 204 so as to prevent bolt 210 from rotating when the latch is applied. In the preferred embodiment, bolt 210 is made of heat-treated, medium carbon steel.

Figure 11:
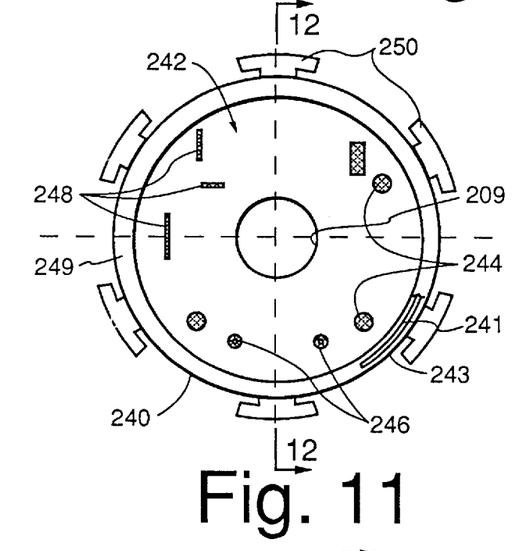
FIGS. 11–16 show details of the wheel hub and tread structure.
Figure 12:
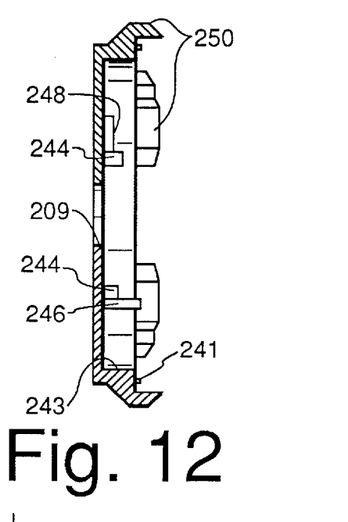

FIGS. 11 and 12 are respectively plan and cross-sectional views of one side of the clamshell housing forming hub 206. As illustrated, the hub shell 240 is a molded part forming a cylindrical cavity 242 concentric with the central opening 209. Disposed within the cavity are heat stakes 244 for securing the base plate 206 (FIG. 8), stand-offs 246 for receiving self-tapping screws used to hold the printed circuit board in place, and a plurality of rectangularly shaped stand-offs 248 for holding other device components in position. Radiating outwardly from the outer rim 249 of the hub shell are integrally formed locking tabs 250 which interdigitate with similar tabs formed in the opposite shell, which, as will be described more fully below, provide means for locking the hub shells together and for holding the molded tread in place. An aligning rib 241 (partially shown in FIG. 11) is provided in the outer edge of shell wall 243.

Figure 13:
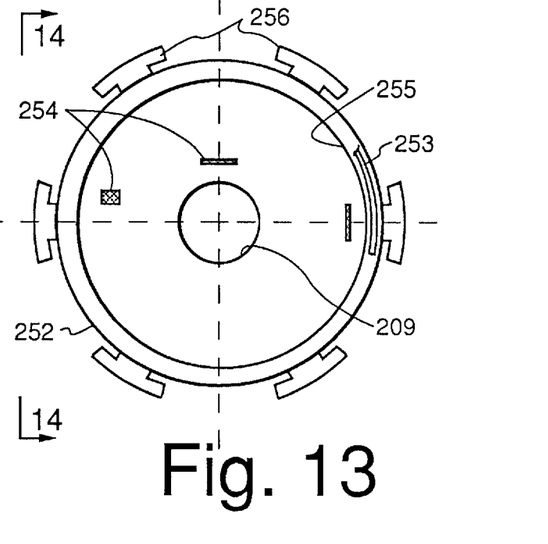
Figure 14:
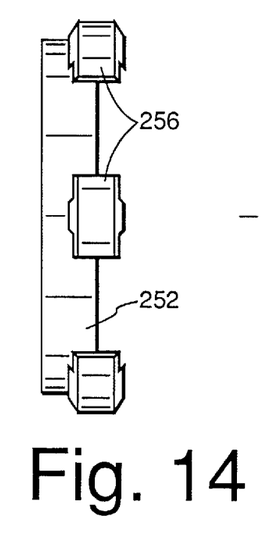

In FIGS. 13 and 14, plan and elevational views of the other hub shell are depicted. Note that the hub shell 252 likewise includes vertical stand-offs or risers 254, a central opening 209, and radially extended fingers 256. However, the fingers 256 are rotated 30° relative to the fingers 250 of hub shell 240 (FIGS. 11 and 12). Note also that an annular groove 253 is formed in the outer face of wall 255 to receive and mate with the groove 241 in shell 240.

Figure 15:
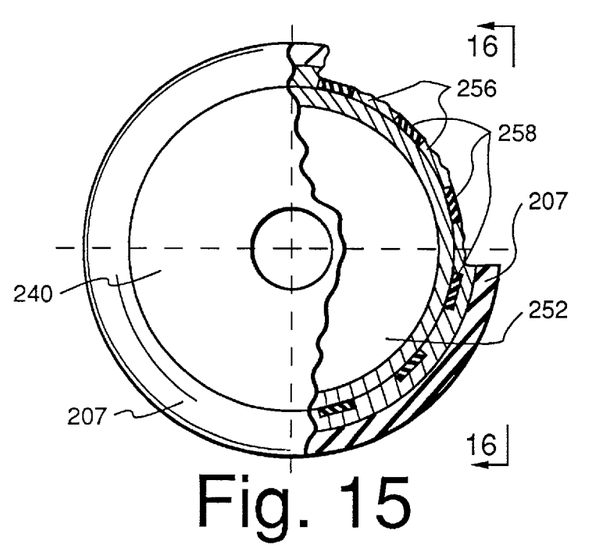
Figure 16:
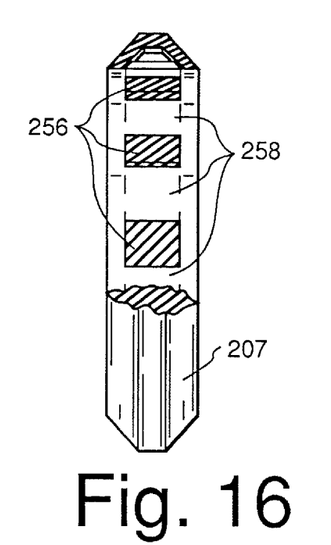

It will thus be appreciated that when the various circuit components are mounted within hub shell 240, hub shell 252 forms a closure for the compartment 215 illustrated in FIG. 9. Once the two shells are closed together, with the fingers 250 and 256 interdigitated, the tread 207 (FIG. 9), which in the preferred embodiment is made of polypropylene, can be molded about the external circumference and through the interstices 258, as illustrated in the partially broken-away view of FIG. 15, so as to simultaneously serve the purposes of holding the clamshell securely together and forming a resilient tread for the wheel. FIG. 16 is an elevational view taken along the line 16—16 of FIG. 15 with the tread 207 and fingers 256 partially broken away to reveal the interstices 258 which will be filled with tread material once the tread is applied.

Figure 17:
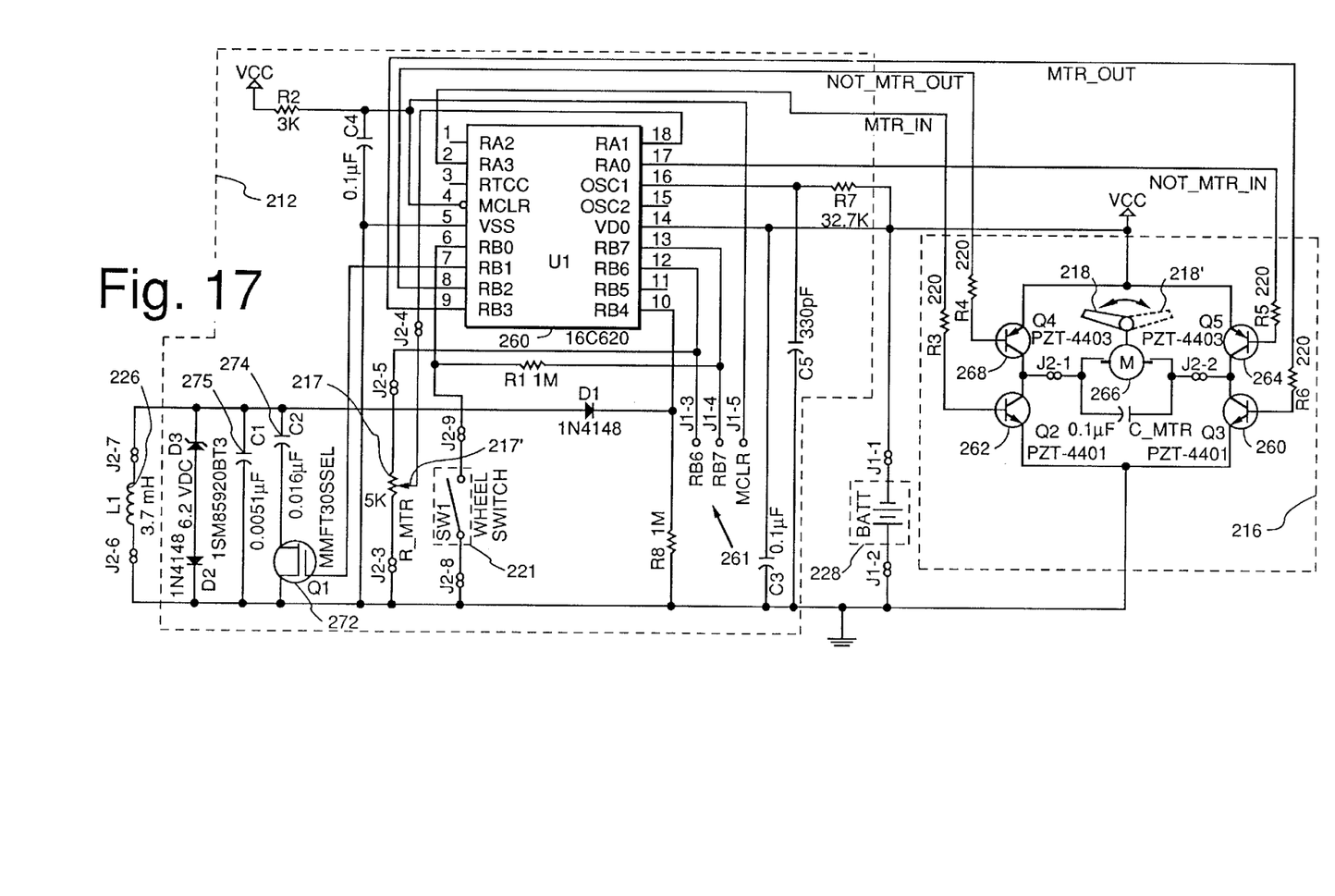
FIG. 17 is a schematic showing details of the lock-energizing circuit.

FIG. 17 schematically depicts a circuit diagram of the electronic components mounted on circuit board 212, as well as the other electrical elements associated therewith and used to manage and control the braking unit. As depicted in FIG. 8, the rotation sensor 221 is mounted on the circuit board 212 and is comprised of a mercury switch that opens and closes on each wheel revolution and generates a pulse that increments a pulse-counting function which in turn generates a count proportional to cart travel distance. In the illustrated preferred embodiment, the pulse-counting function is implemented in a programmable microprocessor 260 (a Microchip 16C620). Programming input to microprocessor 260 is input at terminals 261. Microprocessor 260 detects when the programmed count has been reached and generates outputs at its pins 2 and 17 which cause motor control transistors 262 and 264 to conduct and complete a path from Vcc to ground through motor 266. This causes motor 266 to rotate the bell crank 218 (see also FIG. 8) from its unlatching position (depicted in solid lines) to its latching position (suggested by dashed lines 218'). As is apparent from FIG. 8, since bell crank 218 is coupled to the end of pivotal latch 220 via the spring 224, rotation of crank 218 will cause latch 220 to rotate (clockwise in FIG. 8) from its illustrated unlatched position to a latched position in which notch 222 envelopes the flattened portion 213 of axle bolt 210 (FIG. 10), thereby preventing wheel 202 from rotating. Spring 224 allows crank 218 to be changed in position even if axle flats 213 are not aligned with slot 222. However, it will bias slot 222 into engagement with flat 213 as the wheel rolls further ahead aligning latch 220 relative to axle 210 and allowing proper locking engagement.

As will be explained below, in carrying out a disarming operation microprocessor 260 will cause signals to be developed on its pins 8 and 9 which turn ON motor control transistors 268 and 270. The current flow established thereby causes motor 266 to be energized in its reverse direction to return bell crank 218 from its latching position 218' to its unlatching position 218. The position of the bell crank 218 is detected by the use of a 5 k ohm potentiometer 217, the wiper 217' of which provides an input at pin 18 to a comparator circuit included in microprocessor 260. As the crank rotates, spring 224 (FIG. 8) causes latch 220 to rotate in the counterclockwise direction, disengaging itself from axle bolt 210 and allowing wheel 202 to turn freely.

In this embodiment, a single coil 226 is used to sense both inbound and outbound motion of the cart past the exit/entrance mat 100 (FIG. 4). This is in contrast to the dual coil-sensing configuration disclosed above with relation to the first embodiment. To accomplish this, a switching transistor 272 is used under control of microprocessor 260 to switch a capacitor 274 in and out of the circuit with a parallel-connected capacitor 275 to alternately tune the coil 226 to one of the two frequencies $F_1$ and $F_2$ emitted by the transmitters 96 and 97 (FIG. 4). The operation, however, is essentially the same as described above; namely, if the frequency $F_1$ is detected before $F_2$ is detected, it signifies that the cart is outbound, and microprocessor 260 resets its counter and enables the distance-measuring and -locking function. On the other hand, if the frequency $F_2$ is detected first, it is apparent that the cart is entering the facility, and the distance-measuring function is disabled.

In the event that a cart with wheel armed is taken beyond the maximum allowable distance programmed into processor 260, and the cart is disabled, a store attendant having a hand-held field generator radiating first at frequency $F_1$ and then at $F_2$ is placed near the security wheel unit to disengage the latch and allow the cart to be moved the programmed distance again. The handheld unit in effect makes the unit think it is outbound and thus can travel the full programmed distance if required in returning to the store.

It will of course be apparent that the security wheel unit described above can be substituted for or installed in place of any of the four cart wheels. Furthermore, multiple units can be used on a single cart. For example, one could implement the wheel-locking function using an axle shaft having a transversely extending hole within it, together with a latch having a pin for engaging the hole. Alternatively, a suitable type of friction braking means could be used in place of the latch and shaft combination described above.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A security wheel unit for attachment to a shopping cart to inhibit the unauthorized use and removal of the cart from a designated use area, comprising:

wheel means having a closed chamber formed therein;

axle means journalled to said wheel means, said axle means being attached to a cart and fixed against rotation about its longitudinal axis;

rotation-inhibiting means disposed within said chamber and including a locking member movable between an unlocked position and a locked position in which it engages said axle means to prevent rotation of said wheel means;

counting means disposed within said chamber;

sensor means disposed within said chamber for sensing rotation of said wheel means and for generating an output signal which can be counted by said counting means, said sensor means including a mercury switch positioned to open and close at least one time for each revolution of said wheel means; and actuating means disposed within said chamber and operative in response to said counting means, to cause said rotation-inhibiting means to be moved into said locked position after a predetermined count has been reached.

2. A security wheel unit as recited in claim 1 and further comprising means for detecting passage of the cart past a predetermined reference point and operative to set and reset said counting means.

3. A security wheel unit as recited in claim 2 wherein said predetermined reference point includes means generating a first magnetic field oscillating at a first frequency and a second magnetic field oscillating at a second frequency and wherein said detecting means includes tuned coil means responsive to said first magnetic field and operative to set said counting means, and responsive to said second frequency and operative to reset said counting means.

4. A security wheel unit as recited in claim 1 wherein said axle means passes through said chamber and includes a flattened portion, and wherein said locking member includes a latch having a notch for engaging said flattened portion.

5. A security wheel unit as recited in claim 4 wherein said responsive means includes a bi-directional motor coupled to said latch by a resilient mechanical linkage.

6. A security wheel unit as recited in claim 1 wherein said counting means is implemented by a programmed microprocessor.

7. A security wheel unit as recited in claim 1 wherein said wheel means includes a pair of generally cylindrical shells joined together to form said chamber and resilient tread means circumscribing the outer perimeter of said shells.

8. A security wheel unit as recited in claim 7 wherein each said shell is in the form of a cup-shaped member having a cylindrical outer wall open at one axial extremity and closed at the opposite extremity.

9. A security wheel unit as recited in claim 8 wherein each said shell includes a plurality of fingers extending radially outwardly from said cylindrical outer wall and axially away from said open extremity.

10. A security wheel unit as recited in claim 9 wherein said fingers of each said shell are positioned to interdigitate when said shells are joined together to form said chamber.

11. A security wheel unit as recited in claim 10 wherein said resilient tread means is formed around said outer wall and about said interdigitated fingers and serves to secure said shells together.

12. A security wheel unit as recited in claim 1 and further comprising battery means disposed with said chamber to power said responsive means and said counting means.

13. A security wheel unit as recited in claim 1 wherein said axle means is rigidly affixed to a swivel wheel mount assembly attached to a cart.

14. A security wheel unit for attachment to a shopping cart to inhibit the unauthorized use and removal of the cart from a designated use area, comprising:

wheel means including a cylindrical hub having a closed chamber formed therein;

elongated axle means journalled to said wheel means and passing through said chamber, said axle means being attached to a cart and fixed against rotation about its longitudinal axis; and locking means disposed within said chamber and operative to count rotations of said wheel means about said axle means and to lock said wheel means to said axle means when a predetermined number of rotations have been counted, said locking means including sensor means having a mercury switch positioned to open and close at least one time for each revolution of said wheel means, and for generating at least one sense signal per revolution.

15. A security wheel unit as recited in claim 14 wherein said locking means further includes:

counting means for counting each said sense signal and for generating a count signal when a predetermined number of said sense signals have been counted;

rotation-inhibiting means movable between a first position and a second position in which said axle means is engaged to prevent rotation of said wheel means about said axle means; and actuator means responsive to said count signal and operative to move said rotation-inhibiting means into said second position.

16. A security wheel unit as recited in claim 15 wherein said locking means further includes means responsive to passage of the cart past predetermined reference points and operative upon such passage to reset said counting means to a starting count.

17. A security wheel unit as recited in claim 16 wherein said means responsive to passage includes a magnetic field sensor for sensing magnetic fields generated at said reference points.

18. A security wheel unit as recited in claim 17 wherein the magnetic fields generated at said reference points are generated by spaced-apart sources operating at two different frequencies, and wherein said magnetic field sensor determines the direction of travel of the cart as a function of the order in which said two different frequency fields are detected.

19. A security wheel unit as recited in claim 14 wherein said cylindrical hub includes a pair of generally cylindrical shells joined together to form said chamber and tread means circumscribing the outer perimeter of said shells.

20. A security wheel unit as recited in claim 19 wherein each said shell is in the form of a cup-shaped member having a cylindrical outer wall open at one axial extremity and closed at the opposite extremity.

21. A security wheel unit as recited in claim 20 wherein each said shell includes a plurality of fingers extending radially outwardly from said cylindrical outer wall and axially away from said open extremity.

22. A security wheel unit as recited in claim 21 wherein said fingers of each said shell are positioned to interdigitate when said shells are joined together to form said chamber.

23. A security wheel unit as recited in claim 22 wherein said resilient tread means is formed around said outer wall and about said interdigitated fingers and serves to secure said shells together.

\* \* \* \* \*